(12) United States Patent
Bianchini et al.

(10) Patent No.: US 10,574,642 B2
(45) Date of Patent: *Feb. 25, 2020

(54) PROTECTING A WEB SERVER AGAINST AN UNAUTHORIZED CLIENT APPLICATION

(71) Applicant: INTERNATIONAL BUSINESS MACHINES CORPORATION, Armonk, NY (US)

(72) Inventors: Paolo Bianchini, Rome (IT); Marco Melillo, Termoli (IT)

(73) Assignee: International Business Machines Corporation, Armonk, NY (US)

(*) Notice: Subject to any disclaimer, the term of this patent is extended or adjusted under 35 U.S.C. 154(b) by 15 days.

This patent is subject to a terminal disclaimer.

(21) Appl. No.: 16/051,563

(22) Filed: Aug. 1, 2018

(65) Prior Publication Data
US 2018/0343242 A1 Nov. 29, 2018

Related U.S. Application Data

(63) Continuation of application No. 15/361,967, filed on Nov. 28, 2016, now Pat. No. 10,063,533.

(51) Int. Cl.
H04L 29/06 (2006.01)
H04L 29/08 (2006.01)
G06F 8/41 (2018.01)

(52) U.S. Cl.
CPC ........... H04L 63/08 (2013.01); G06F 8/41 (2013.01); H04L 67/02 (2013.01); H04L 67/42 (2013.01)

(58) Field of Classification Search
CPC .................. H04L 63/08; H04L 67/02
See application file for complete search history.

(56) References Cited

U.S. PATENT DOCUMENTS 8,201,248 B2 6/2012 Boesgaard
8,756,579 B1 6/2014 Colton et al.
(Continued)

FOREIGN PATENT DOCUMENTS

CN 104113552 10/2014
CN 104850789 8/2015
(Continued)

OTHER PUBLICATIONS

Raghavan, Sriram et al; Determining the Origin of Downloaded files Using Metadata Associations; Journal of Communications, vol. 8, No. 12; Dec. 2013; pp. 902-910.
(Continued)

Primary Examiner — Dao Q Ho
(74) Attorney, Agent, or Firm — Schmeiser, Olsen & Watts; Mark C. Vallone

(57) ABSTRACT

An approach is provided for securing communication between a server computer and a client computer. A first string is sent to the client in response to a request to permit an application being executed by the client computer to access a first function. A second string that includes a parameter of a second function is received. The second string is a result of a conversion of the first string to a command and an execution of the command by the client. A result of an execution of the second function is matched with code information obtained from files of the application. Based on the match to the result of the execution of the second function and without requiring an implementation of native code which checks the authenticity of the application, the server validates the authenticity of the application and permits the application to access the first function.

17 Claims, 3 Drawing Sheets

(56) References Cited

U.S. PATENT DOCUMENTS

| | | |
|---|---|---|
| 8,868,915 B2 | 10/2014 | Counterman |
| 9,100,245 B1 | 8/2015 | Andrews et al. |
| 9,154,568 B2 | 10/2015 | Alison et al. |
| 10,063,533 B2 | 8/2018 | Bianchini |
| 2006/0053080 A1 | 3/2006 | Edmonson et al. |
| 2008/0178273 A1 | 7/2008 | Weber |
| 2011/0099629 A1 | 4/2011 | Boesgaard |
| 2013/0031643 A1 | 1/2013 | Rogel et al. |
| 2014/0189797 A1 | 7/2014 | Nori et al. |
| 2015/0319174 A1 | 11/2015 | Hayton et al. |
| 2018/0152427 A1 | 5/2018 | Bianchini et al. |

FOREIGN PATENT DOCUMENTS

| | | |
|---|---|---|
| CN | 105556893 | 5/2016 |
| CN | 105743839 | 7/2016 |
| WO | 2010138611 | 12/2010 |

OTHER PUBLICATIONS

Raghavan, Sriram; A Framework for Identifying Associations in Digital Evidence Using Metadata; Thesis; Queensland University of Technology, Brisbane; May 2014; 238 pages.

Debiao, He et al.; An ID-based client authentication with key agreement protocol for mobile client-server environment on ECC with provable security; Information Fusion, vol. 13; Jul. 2012; pp. 223-230.

Huang, Yao-Wen et al.; Securing Web Application code by Static Analysis and Runtime Protection; Proceedings of the 13th International Conference on World Wide Web; May 17-20, 2004; pp. 40-52.

IBM; IBM MobileFirst Platform Foundation 7.0; Retrieved from the Internet Jul. 28, 2016; URL: https://mobilefirstplatform.ibmcloud.com/tutorials/en/foundation/7.0; 1 page.

Jochen, Michael J.; Mobile Code Integrity Through Static Program Analysis, Steganography, and Dynamic Transformation Control; Chapter 3: The SECRYT Framework; Dissertation submitted to Faculty of the University of Delaware; Spring 2008; pp. 22-34.

Notification of Transmittal of the International Search Report and the Written Opinion of the International Search Authority, or the Declaration, Written Opinion of the International Searching Authority, and International Search Report; dated Jan. 26, 2018; International Application No. PCT/IB2017/057409; Filing Date Nov. 27, 2017; 10 pages.

Trevor, Jim et al.; Defeating Script Injection Attacks with Browser-Enforced Embedded Policies; Proceedings of the 16th International Conference on World Wide Web; May 8-12, 2007; pp. 601-610.

Syta, James M.; List of IBM Patents or Patent Applications Treated as Related; Aug. 1, 2018; 1 page.

PROTECTING A WEB SERVER AGAINST AN UNAUTHORIZED CLIENT APPLICATION

CROSS REFERENCE TO RELATED APPLICATIONS

This application is a continuation application claiming priority to Ser. No. 15/361,967 filed Nov. 28, 2016, the contents of which are hereby incorporated by reference.

BACKGROUND

The present invention relates to securing communications between a client and a server, and more particularly to securing a web server against an unauthorized mobile device client application.

Hybrid mode mobile applications may run JavaScript® code inside a native container, which simplifies cross platform development, but exposes back-end servers to a possibility of being called by unauthorized applications. JavaScript is a registered trademark of Oracle America Inc. located in Redwood Shores, Calif. An attacker can inspect the JavaScript® code deployed with the application and write the attacker's own application running unauthorized calls to the server. Some known mobile application development frameworks may protect the server from modified code on a mobile phone by using a native implementation (e.g., a challenge token sent from a server to the application is processed by compiled native code, so that a third party attacker cannot see the logic of the processing).

SUMMARY

In a first embodiment, the present invention provides a method of securing communication between a server computer and a client computer. The method includes the server computer sending a first string to the client computer in response to a request for the server computer to check an authenticity of an application being executed by the client computer and permit the application to access a first function executed by the server computer. The method further includes, in response to sending the first string, the server computer receiving a second string that includes a parameter of a second function which is an internal function of the server computer. The second string is a result of a conversion of the first string to a command by the client computer and a local execution of the command by the client computer. The method further includes the server computer converting the second string into a call to the second function to check the authenticity of the application. The method further includes the server computer executing the second function by using the call to the second function. The method further includes based on a result of the execution of the second function and without requiring an implementation of native code which checks the authenticity of the application, the server computer determining whether to (i) validate the authenticity of the application and permit the application to access the first function or (ii) prevent the application from accessing the first function.

In a second embodiment, the present invention provides a computer program product including a computer-readable storage medium and a computer-readable program code stored in the computer-readable storage medium. The computer-readable program code includes instructions that are executed by a central processing unit (CPU) of a server computer system to implement a method of securing communication between the server computer system and a client computer system. The method includes the server computer system sending a first string to the client computer system in response to a request for the server computer system to check an authenticity of an application being executed by the client computer system and permit the application to access a first function executed by the server computer system. The method further includes, in response to sending the first string, the server computer system receiving a second string that includes a parameter of a second function which is an internal function of the server computer system. The second string is a result of a conversion of the first string to a command by the client computer system and a local execution of the command by the client computer system. The method further includes the server computer system converting the second string into a call to the second function to check the authenticity of the application. The method further includes the server computer system executing the second function by using the call to the second function. The method further includes based on a result of the execution of the second function and without requiring an implementation of native code which checks the authenticity of the application, the server computer system determining whether to (i) validate the authenticity of the application and permit the application to access the first function or (ii) prevent the application from accessing the first function.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of securing communication between the server computer system and a client computer system. The method includes the server computer system sending a first string to the client computer system in response to a request for the server computer system to check an authenticity of an application being executed by the client computer system and permit the application to access a first function executed by the server computer system. The method further includes, in response to sending the first string, the server computer system receiving a second string that includes a parameter of a second function which is an internal function of the server computer system. The second string is a result of a conversion of the first string to a command by the client computer system and a local execution of the command by the client computer system. The method further includes the server computer system converting the second string into a call to the second function to check the authenticity of the application. The method further includes the server computer system executing the second function by using the call to the second function. The method further includes based on a result of the execution of the second function and without requiring an implementation of native code which checks the authenticity of the application, the server computer system determining whether to (i) validate the authenticity of the application and permit the application to access the first function or (ii) prevent the application from accessing the first function.

Embodiments of the present invention validate the authenticity of a mobile application to prevent unauthorized applications from calling a server, without requiring a native implementation for checking application authenticity. Embodiments of the present invention may be implemented in any client-server architecture or may be added to an authentication framework that is already implemented in the client-server architecture if the authentication framework is configured to ask the client for one authentication (e.g., ask for a password).

DETAILED DESCRIPTION

Overview

Embodiments of the present invention validate an application in a client/server environment or a hybrid mode mobile application as being authorized to access a server. The application operates in a framework that implements a security check, so that when the client calls a function exposed by the server, the server sends a challenge to the client, which allows the client to authenticate itself and be authorized to call the server's function in a protected way. In one embodiment, a JavaScript® file of the hybrid mode mobile application is augmented with code necessary to obtain any available function in the file itself by adding a code executor function. An attacker is not able to identify the technique used to protect the code since the code executor function executes the code received at runtime within a string variable. The server can modify the code remotely and validate the modification of the code at runtime. The security technique can be used in any client/server architecture with a file written in an interpreted programming language that is a functional programming language (e.g., Lisp, Scheme, Haskell, ML, lambda, etc.) or that supports functional programming, such as the JavaScript® web scripting language. The programming language must be capable of: (1) converting a function into a string; (2) modifying a function at runtime; and (3) transforming a string into a function.

Embodiments of the present invention allow the server to inject any type of code to execute on a mobile device or other client computer to implement the relevant security and authenticity checks before allowing function calls. Such routines are not available in the source files (e.g., JavaScript® source files), but are only executed in a controlled manner by the server itself. Security is augmented by the server being capable of modifying over time the security implementation and running extra checks on, for example, execution time and behavior of the client application.

Embodiments of the present invention secure the communication between the server and the client by performing the following steps: (1) when the client invokes a function exposed by the server, run a security challenge in the client side; (2) the server sends a string to run (e.g., retrieve and send a specific part of the JavaScript® source file); (3) the client runs the code and sends the result to the server and can send the original function as a string; and (4) the server reads the result and decides whether the client is authentic.

Protection during transport and code obfuscation are required to prevent an attacker from understanding the overall process. In one embodiment, the technique for securing communication between client and server uses JavaScript® code and does not use a native implementation.

System for Securing Communication Between a Server and a Client

Figure 1:
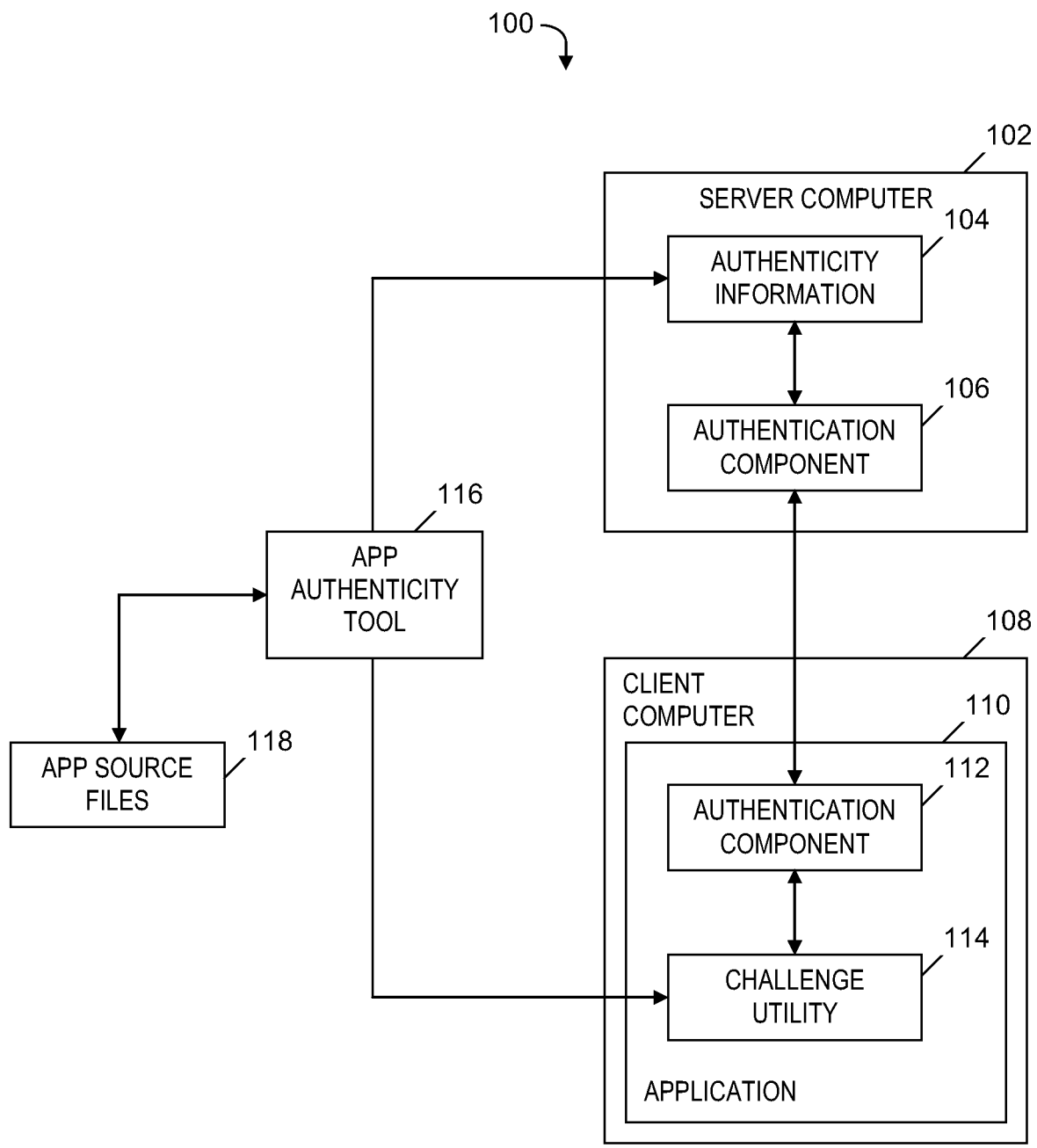
FIG. 1 is a block diagram of a system for securing communication between a server computer and a client computer, in accordance with embodiments of the present invention.

FIG. 1 is a block diagram of a system 100 for securing communication between a server computer and a client computer, in accordance with embodiments of the present invention. System 100 a server computer 102, which stores authenticity information 104 and executes a software-based server-side authentication component 106. System 100 also includes a client computer 108, which executes a software-based application (e.g., mobile application) 110, which includes a client-side authentication component 112 and a challenge utility 114.

Prior to a release of application 110, a software-based app authenticity tool 116 is executed on a computer (e.g., server computer 102 or another computer that is not shown) to create authenticity information 104 and challenge utility 114. Authenticity information 104 is stored in a data repository and includes security challenges and the correct answers to the security challenges. App authenticity tool 116 reads from a data repository that stores app source files 118, which are the source files of application 110, i.e., an application whose authenticity needs to be validated by a security challenge in response to the application attempting to access a function of server computer 102.

Challenge utility 114 is code that executes to respond to the security challenge sent by server computer 102 to client computer 108. Challenge utility 114 is not written inside application 110, but is rather injected into application 110 by app authenticity tool 116. In one embodiment, challenge utility 114 is written in the JavaScript® language. As used herein, a challenge or security challenge is a request from server 102 sent to client computer 108 to respond with code information associated with a function, where the code information is obtained by modifying the function at runtime, obtaining a portion of the code of the function, or executing the code of the function.

Server-side authentication component 106 selects a security challenge from the security challenges stored in authenticity information 104 and sends the selected security challenge to client-side authentication component 112 to validate the authenticity of application 110. Client-side authentication component 112 receives the security challenge and sends a response to the security challenge to server-side authentication component 106, which checks the response against the correct answer in authenticity information 104. If the response matches the correct answer in authenticity information 104, server-side authentication component 106 validates the authenticity of application 110 and permits application 110 to access the function of server computer 102; otherwise, server-side authentication component 106 prevents application 110 from accessing the function of server computer 102.

Figure 2:
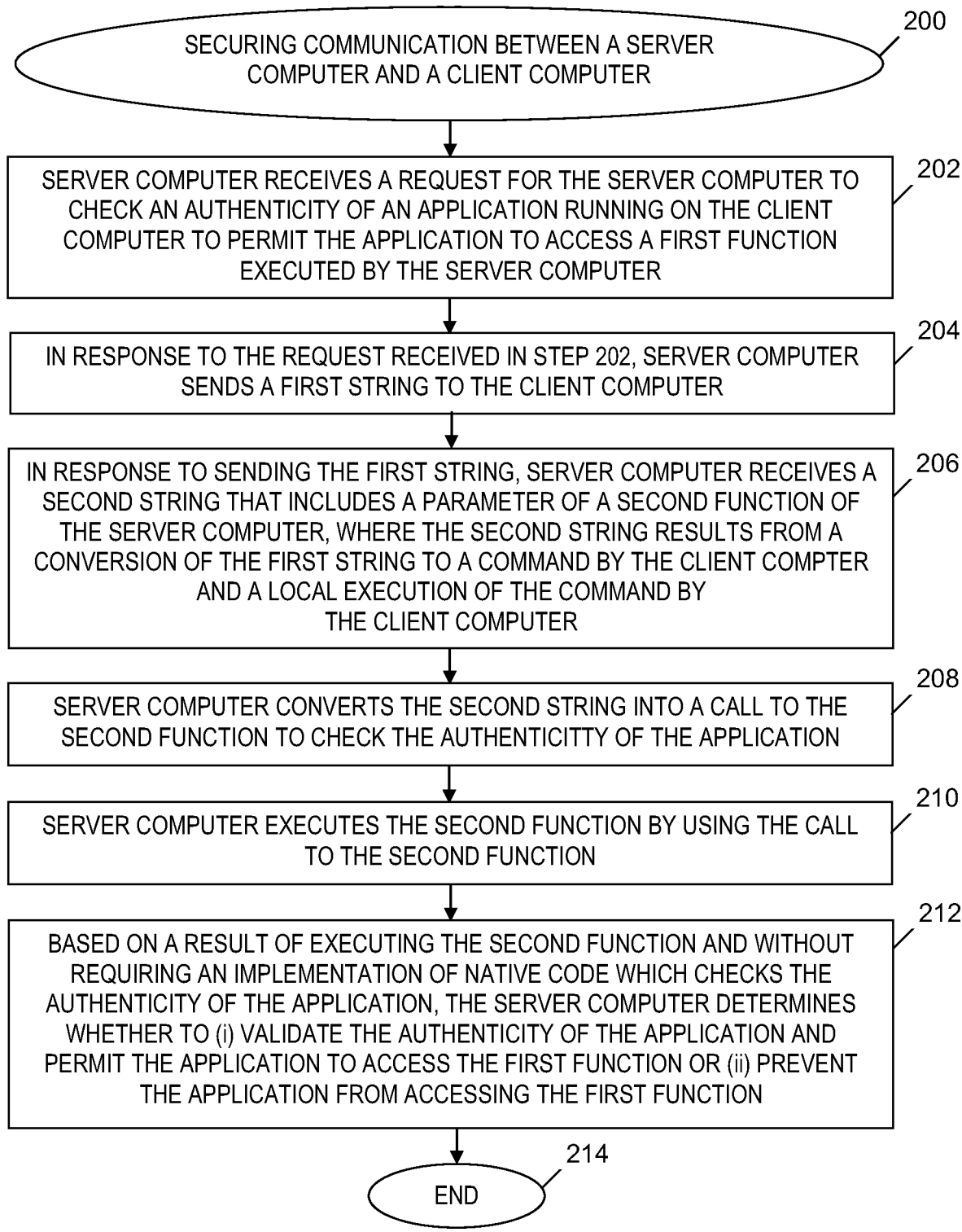
FIG. 2 is a flowchart of a process of securing communication between a server computer and a client computer, where the process is implemented in the system of FIG. 1, in accordance with embodiments of the present invention.
Figure 3:
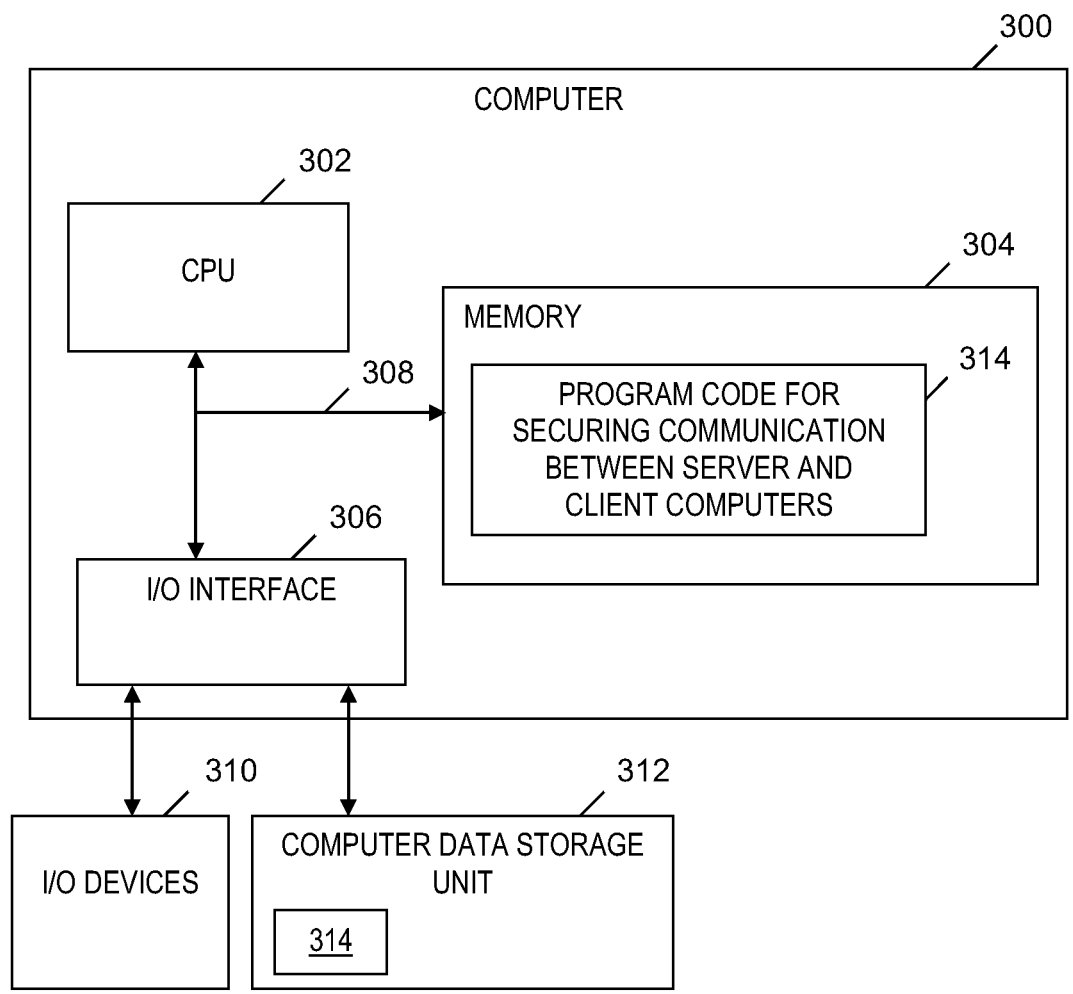
FIG. 3 is a block diagram of a computer that includes the server computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Securing Communication Between a Server and a Client

FIG. 2 is a flowchart of a process of securing communication between a server computer and a client computer, where the process is implemented in the system of FIG. 1, in accordance with embodiments of the present invention. The process of FIG. 2 starts at step 200. Prior to step 202, client computer 108 (see FIG. 1) runs application 110 (see FIG. 1) and application 110 (see FIG. 1) attempts to execute a first function executed by server computer 102 (see FIG. 1) and the first function is protected by a security framework. In one embodiment, application 110 (see FIG. 1) is a hybrid mode mobile application.

In step 202, server computer 102 (see FIG. 1) receives a request from client computer 108 (see FIG. 1) for server computer 102 (see FIG. 1) to validate an authenticity of application 110 (see FIG. 1) and thereby permit application 110 (see FIG. 1) to access the first function executed by the server computer 102 (see FIG. 1). In one embodiment, server-side authentication component 106 (see FIG. 1) receives the aforementioned request from client-side authentication component 112 (see FIG. 1). Alternately, in response to the attempt by application 110 (see FIG. 1) to access the first function, server computer 102 (see FIG. 1) directs server-side authentication component 106 (see FIG. 1) to validate the authenticity of application 110 (see FIG. 1).

After step 202 and prior to step 204, in response to the request received in step 202, server-side authentication component 106 (see FIG. 1) selects a security challenge from multiple security challenges included in authenticity information 104 (see FIG. 1) and generates code of a command that performs an action to obtain a response to the security challenge. In step 204, in response to (1) the request received in step 202, (2) the security challenge being selected, and (3) the code of the command being generated, server-side authentication component 106 (see FIG. 1) sends a first string to client computer 108 (see FIG. 1). The first string includes the code of the command that performs the action to obtain the response to the selected security challenge. The command is to be executed by the client computer 108 (see FIG. 1). In one embodiment, the action performed by the command includes modifying code of a second function included in application 110 (see FIG. 1), reading and obtaining at least a portion of the code of the second function, or executing the code of the second function, where the code is written in an interpreted programming language that is a functional programming language or that supports functional programming, and that has the following capabilities: (1) convert a function into a string; (2) modify a function at runtime; and (3) transform a string into a function.

After step 204 and prior to step 206, client-side authentication component 112 (see FIG. 1) receives the first string, thereby invoking a client-side security framework. Client-side authentication component 112 (see FIG. 1) converts the received first string into the command, and subsequently sends the command to challenge utility 114 (see FIG. 1). In response to receiving the command, challenge utility 114 (see FIG. 1) executes the command locally. By executing the command, challenge utility 114 (see FIG. 1) performs the aforementioned action, obtains a second string which is a result of the performing the action, and sends the second string to server-side authentication component 106 (see FIG. 1), where the second string includes a parameter of a second function to be accessed by server computer 102 (see FIG. 1).

In step 206, in response to sending the first string in step 204, the conversion of the first string into the command, the local execution of the command to perform the action, the obtaining of the second string which is the result of performing the action, and the sending of the second string, server-side authentication component 106 (see FIG. 1) receives the second string.

In step 208, authentication component 106 (see FIG. 1) converts the second string into a call to the second function, which is an internal server function, and data to validate the authenticity of application 110 (see FIG. 1).

In step 210, server-side authentication component 106 (see FIG. 1) executes the second function by using the call to the second function that resulted from the conversion of the second string in step 208. In one embodiment, the execution in step 210 uses a reflection capability of the second function to modify code of the second function, read and obtain at least a portion of the code of the second function, or execute the code of the second function.

After step 210 and prior to step 212, server-side authentication component 106 (see FIG. 1) obtains a result of the execution of the second function in step 210.

Prior to step 212, server-side authentication component 106 (see FIG. 1) determines whether the result of the execution of the second function in step 210 matches the correct answer to the selected security challenge, where the correct answer is stored in authenticity information 104 (see FIG. 1). In step 212, based on the result of executing the second function in step 210 and the determination of whether the result matches the correct answer to the selected security challenge, and without requiring an implementation of native code which checks the authenticity of application 110 (see FIG. 1), server-side authentication component 106 (see FIG. 1) determines whether to (i) validate the authenticity of application 110 (see FIG. 1) and thereby permit application 110 (see FIG. 1) to access the first function executed on server 102 (see FIG. 1) or (ii) prevent application 110 (see FIG. 1) from accessing the first function.

If server-side authentication component 106 (see FIG. 1) determines that the result of the execution of the second function in step 210 matches the correct answer to the selected security challenge, server-side authentication component 106 (see FIG. 1) validates the authenticity of application 110 (see FIG. 1) and permits application 110 (see FIG. 1) to access the first function. After being permitted to access the first function, server computer 102 runs the original call to the first function. If server-side authentication component 106 (see FIG. 1) determines that the result does not match the correct answer, server-side authentication component 106 (see FIG. 1) prevents application 110 (see FIG. 1) from accessing the first function. In one embodiment, preventing application 110 (see FIG. 1) from accessing the first function includes server computer 102 (see FIG. 1) generating an error notification and not returning the original call to the first function.

Following step 212, the process of FIG. 2 ends at step 214.

In an alternate embodiment, in a client-server architecture with no security framework already implemented, the following steps are performed in response to client computer 108 (see FIG. 1) attempting to access call function f1 on server computer 102 (see FIG. 1): (1) client computer 108 (see FIG. 1) calls a CommandGenerator function on server computer 102 (see FIG. 1), where CommandGenerator generates a command to be run on the client side; (2) server computer 102 (see FIG. 1) sends the command to client computer 108 (see FIG. 1); (3) client computer 108 (see FIG. 1) calls a RunCommand function to run the command locally; (4) client computer 108 (see FIG. 1) obtains the result of calling RunCommand as a string s1; (5) client computer 108 (see FIG. 1) calls function f1 on server computer 102 (see FIG. 1) and passes string s1 in the call to function f1; and (6) server computer 102 (see FIG. 1) runs an internal server function, CheckProtection, to determine if string s1 is the result expected from a call to function f1 from an authentic application. If string s1 is the expected result, then server computer 102 (see FIG. 1) runs the original call to function f1. If string s1 is not the expected result, then server computer 102 (see FIG. 1) raises an error and does not return the original call to function f1.

Computer System

FIG. 3 is a block diagram of a computer 300 that includes the server computer included in the system of FIG. 1 and that implements the process of FIG. 2, in accordance with embodiments of the present invention. Computer 300 is a computer system that generally includes a central processing unit (CPU) 302, a memory 304, an input/output (I/O) interface 306, and a bus 308. Further, computer 300 is coupled to I/O devices 310 and a computer data storage unit 312. In one embodiment, computer 300 includes server computer 102 (see FIG. 1). CPU 302 performs computation and control functions of computer 300, including executing instructions included in program code 314 for server-side authentication component 106 (see FIG. 1) to perform a method of securing communication between server and client computers, where the instructions are executed by CPU 302 via memory 304. In another embodiment, computer 300 includes client computer 108 (see FIG. 1) and CPU 302 performs computation and control functions of computer 300, including executing instructions included in program code 314 for client-side authentication component 112 (see FIG. 1) to perform a method of securing communication between server and client computers. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including two-layer display 104 (see FIG. 1), keyboard, etc. Bus 308 provides a communication link between each of the components in computer 300, and may include any type of transmission link, including electrical, optical, wireless, etc.

I/O interface 306 also allows computer 300 to store information (e.g., data or program instructions such as program code 314) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to secure communication between server and client computers. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

Storage unit 312 and/or one or more other computer data storage units (not shown) that are coupled to computer 300 may store any combination of: authenticity information 104 (see FIG. 1) and app source files 118 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to securing communication between server and client computers. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 300) including one or more processors (e.g., CPU 302), wherein the processor(s) carry out instructions contained in the code causing the computer system to secure communication between server and client computers. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of securing communication between server and client computers.

While it is understood that program code 314 for securing communication between server and client computers may be deployed by manually loading directly in client, server and proxy computers (not shown) via loading a computer-readable storage medium (e.g., computer data storage unit 312), program code 314 may also be automatically or semi-automatically deployed into computer 300 by sending program code 314 to a central server or a group of central servers. Program code 314 is then downloaded into client computers (e.g., computer 300) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of securing communication between server and client computers. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 300). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 300) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 300) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 300), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of securing communication between a server computer and a client computer, the method comprising the steps of:
   the server computer sending a first string to the client computer in response to a request for the server computer to check an authenticity of an application being executed on the client computer and permit the application to access a first function executed by the server computer, wherein the first function is written in an interpreted programming language configured to convert functions written in the interpreted programming language into respective strings, modify the functions at runtime, and convert the strings into respective functions written in the interpreted programming language;
   in response to the step of sending the first string, the server computer receiving a second string that includes a parameter of a second function which is an internal function of the server computer, the second string being a result of a conversion of the first string to a command by the client computer and a local execution of the command by the client computer;
   the server computer matching a result of an execution of the second function with code information obtained from files of the application being executed by the client computer;
   based on the result of the execution of the second function matching the code information obtained from the files of the application and without requiring an implementation of native code which checks the authenticity of the application, the server computer validating the authenticity of the application and permitting the application to access the first function;
   the server computer receiving a plurality of files of a hybrid application, the plurality of files being written in a programming language that supports functional programming and is able to convert functions into respective strings, modify functions at runtime, and transform strings into respective functions;
   the server computer generating a code executor file and linking the code executor file to the plurality of files so that the code executor file has access to functions in the plurality of files, the code executor file including code that performs the conversion of the first string to the command; and
   the server computer obtaining code information from the plurality of files and storing the code information in the server computer, wherein the steps of validating the authenticity of the client computer and permitting the client computer to access the first function are based on the code information obtained from the plurality of files of the hybrid application,
   wherein the step of receiving the plurality of files includes receiving the plurality of files written in a JavaScript programming language.

2. The method of claim 1, further comprising the steps of:
   the server computer converting the second string into a call to the second function to check the authenticity of the application; and
   the server computer executing the second function by using the call to the second function.

3. The method of claim 1, further comprising the steps of:
   based on the result of the execution of the second function matching the code information, a security framework of the server computer automatically executing the first function for the client computer; and
   the server computer sending a result of the step of executing the first function to the client computer.

4. The method of claim 1, wherein the local execution by the client computer of the command includes reading at least a portion of code of the second function, executing the code of the second function, or modifying the code of the second function.

5. The method of claim 1, further comprising the step of adding the steps of sending the first string, receiving the second string, converting the second string, matching the result of the execution of the second function, and validating the authenticity of the client computer and permitting the client computer to access the first function to an authentication framework implemented in a client-server architecture, wherein the authentication framework asks the client computer for an authentication.

6. The method of claim 1, further comprising the steps of:
   the server computer receiving a request from the hybrid application running on the client computer to access the first function; and
   in response to the step of receiving the request, the server computer determining that the first function is protected by the security framework implemented on the server computer and that an access to the first function requires a validation of the authenticity of the client computer, wherein the step of sending the first string to the client computer is performed in response to the step of determining that the access of the first function requires the validation of the authenticity of the client computer.

7. The method of claim 1, further comprising the step of:
   providing at least one support service for at least one of creating, integrating, hosting, maintaining, and deploying computer-readable program code in the computer, the program code being executed by a processor of the computer to implement the steps of sending the first string, receiving the second string, matching the result of the execution of the second function, validating the authenticity of the client computer, permitting the client computer to access the first function, receiving the plurality of files of the hybrid application, generating the code executor file, linking the code executor file to the plurality of files, obtaining the code information from the plurality of files, and storing the code information in the server computer.

8. A computer program product, comprising:
a computer-readable storage device; and
a computer-readable program code stored in the computer-readable storage device, the computer-readable program code containing instructions that are executed by a central processing unit (CPU) of a server computer system to implement a method of securing communication between the server computer system and a client computer system, the method comprising the steps of:

the server computer system sending a first string to the client computer system in response to a request for the server computer system to check an authenticity of an application being executed on the client computer system and permit the application to access a first function executed by the server computer system, wherein the first function is written in an interpreted programming language configured to convert functions written in the interpreted programming language into respective strings, modify the functions at runtime, and convert the strings into respective functions written in the interpreted programming language;

in response to the step of sending the first string, the server computer system receiving a second string that includes a parameter of a second function which is an internal function of the server computer system, the second string being a result of a conversion of the first string to a command by the client computer system and a local execution of the command by the client computer system;

the server computer system matching a result of an execution of the second function with code information obtained from files of the application being executed by the client computer system;

based on the result of the execution of the second function matching the code information obtained from the files of the application and without requiring an implementation of native code which checks the authenticity of the application, the server computer system validating the authenticity of the application and permitting the application to access the first function;

the server computer system receiving a plurality of files of a hybrid application, the plurality of files being written in a programming language that supports functional programming and is able to convert functions into respective strings, modify functions at runtime, and transform strings into respective functions;

the server computer system generating a code executor file and linking the code executor file to the plurality of files so that the code executor file has access to functions in the plurality of files, the code executor file including code that performs the conversion of the first string to the command; and the server computer system obtaining code information from the plurality of files and storing the code information in the server computer system, wherein the steps of validating the authenticity of the client computer and permitting the client computer to access the first function are based on the code information obtained from the plurality of files of the hybrid application, wherein the step of receiving the plurality of files includes receiving the plurality of files written in a JavaScript programming language.

9. The computer program product of claim 8, wherein the method further comprises the steps of:
the server computer system converting the second string into a call to the second function to check the authenticity of the application; and
the server computer system executing the second function by using the call to the second function.

10. The computer program product of claim 8, wherein the method further comprises the steps of:
based on the result of the execution of the second function matching the code information, a security framework of the server computer system automatically executing the first function for the client computer system; and
the server computer system sending a result of the step of executing the first function to the client computer system.

11. The computer program product of claim 8, wherein the local execution by the client computer system of the command includes reading at least a portion of code of the second function, executing the code of the second function, or modifying the code of the second function.

12. The computer program product of claim 8, wherein the method further comprises the step of adding the steps of sending the first string, receiving the second string, converting the second string, matching the result of the execution of the second function, and validating the authenticity of the client computer system and permitting the client computer system to access the first function to an authentication framework implemented in a client-server architecture, wherein the authentication framework asks the client computer system for an authentication.

13. A server computer system comprising:
a central processing unit (CPU);
a memory coupled to the CPU; and
a computer readable storage device coupled to the CPU, the storage device containing instructions that are executed by the CPU via the memory to implement a method of securing communication between the server computer system and a client computer system, the method comprising the steps of:

the server computer system sending a first string to the client computer system in response to a request for the server computer system to check an authenticity of an application being executed on the client computer system and permit the application to access a first function executed by the server computer system, wherein the first function is written in an interpreted programming language configured to convert functions written in the interpreted programming language into respective strings, modify the functions at runtime, and convert the strings into respective functions written in the interpreted programming language;

in response to the step of sending the first string, the server computer system receiving a second string that includes a parameter of a second function which is an internal function of the server computer system, the second string being a result of a conversion of the first string to a command by the client computer system and a local execution of the command by the client computer system;

the server computer system matching a result of an execution of the second function with code information obtained from files of the application being executed by the client computer system;

based on the result of the execution of the second function matching the code information obtained from the files of the application and without requiring an implementation of native code which checks the authenticity of the application, the server computer system validating the authenticity of the application and permitting the application to access the first function;

the server computer system receiving a plurality of files of a hybrid application, the plurality of files being written in a programming language that supports functional programming and is able to convert functions into respective strings, modify functions at runtime, and transform strings into respective functions;

the server computer system generating a code executor file and linking the code executor file to the plurality of files so that the code executor file has access to functions in the plurality of files, the code executor file including code that performs the conversion of the first string to the command; and the server computer system obtaining code information from the plurality of files and storing the code information in the server computer system, wherein the steps of validating the authenticity of the client computer and permitting the client computer to access the first function are based on the code information obtained from the plurality of files of the hybrid application, wherein the step of receiving the plurality of files includes receiving the plurality of files written in a JavaScript programming language.

14. The server computer system of claim 13, wherein the method further comprises the steps of:

the server computer system converting the second string into a call to the second function to check the authenticity of the application; and the server computer system executing the second function by using the call to the second function.

15. The server computer system of claim 13, wherein the method further comprises the steps of:

based on the result of the execution of the second function matching the code information, a security framework of the server computer system automatically executing the first function for the client computer system; and the server computer system sending a result of the step of executing the first function to the client computer system.

16. The server computer system of claim 13, wherein the local execution by the client computer system of the command includes reading at least a portion of code of the second function, executing the code of the second function, or modifying the code of the second function.

17. The server computer system of claim 13, wherein the method further comprises the step of adding the steps of sending the first string, receiving the second string, converting the second string, matching the result of the execution of the second function, and validating the authenticity of the client computer system and permitting the client computer system to access the first function to an authentication framework implemented in a client-server architecture, wherein the authentication framework asks the client computer system for an authentication.

* * * * *